United States Patent
Hnizdor

(12) Patent No.: US 6,581,320 B1
(45) Date of Patent: Jun. 24, 2003

(54) TUBE WEIGHT LURE APPARATUS

(76) Inventor: Thomas A. Hnizdor, 9164 Brady, Redford, MI (US) 48239

( * ) Notice: Subject to any disclaimer, the term of this patent is extended or adjusted under 35 U.S.C. 154(b) by 0 days.

(21) Appl. No.: 10/010,365

(22) Filed: Nov. 13, 2001

Related U.S. Application Data

(60) Provisional application No. 60/248,380, filed on Nov. 14, 2000.

(51) Int. Cl.$^7$ ............................................. A01K 85/10
(52) U.S. Cl. ..................................... 43/42.39; 43/42.35
(58) Field of Search ........................... 43/42.35, 42.36, 43/42.39, 42.24, 42.45

(56) References Cited

U.S. PATENT DOCUMENTS

| | | | |
|---|---|---|---|
| 633,797 A | 9/1899 | Cantrell | |
| 862,150 A | 8/1907 | Fredricks | |
| 975,833 A | 11/1910 | Cox | |
| RE14,377 E | 10/1917 | Cox | |
| 1,316,040 A | * 9/1919 | Jamison | 43/42.22 |
| 1,522,185 A | 1/1925 | Hawes | |
| 1,540,586 A | 6/1925 | Adam | |
| 1,598,786 A | * 9/1926 | Romadke | 43/42.26 |
| 1,994,692 A | 3/1935 | Davenport | 43/48 |
| 2,306,692 A | * 12/1942 | Flood | 43/42.21 |
| 2,575,139 A | * 11/1951 | Smith | 43/42.33 |
| 2,611,985 A | 9/1952 | Lloyd, Jr. | 43/42.25 |
| 2,776,518 A | * 6/1954 | Felmlee | 43/42.24 |
| 2,718,725 A | * 9/1955 | Thurman | 43/42.31 |
| 3,035,368 A | * 5/1962 | Collins | 43/42.09 |
| 3,141,255 A | * 7/1964 | Randall | 43/42.11 |
| 3,568,354 A | 3/1971 | Yacko | 43/17.6 |
| 3,693,275 A | * 9/1972 | Craig | 43/15 |
| 4,163,337 A | 8/1979 | Kress | 43/42.05 |
| 5,094,026 A | 3/1992 | Correll et al. | 43/42.28 |
| 5,628,140 A | 5/1997 | Hnizdor | 43/43.16 |
| 5,953,850 A | 9/1999 | Hnizdor | 43/43.32 |
| 6,122,856 A | 9/2000 | Hnizdor | 43/42.25 |

* cited by examiner

Primary Examiner—Charles T. Jordan
Assistant Examiner—Kimberly S. Smith
(74) Attorney, Agent, or Firm—Young & Basile, PC

(57) ABSTRACT

A tube weight lure apparatus includes a lure body having a hollow interior cavity. An inner tube extends through the cavity and receives a fishing line therethrough. A weight member is fixedly mounted on the inner tube within the interior cavity in the body. The weight member is in the form of a hollow tube variably positionable along the length of the inner tube. The inner tube is flexible and has a length greater than the length of the body to assume an arcuate shape when the first and second ends of the inner tube are fixed to the body. In this aspect, the weight member is mounted at the valley of the arcuate shape of the inner tube.

22 Claims, 2 Drawing Sheets

TUBE WEIGHT LURE APPARATUS

CROSS REFERENCE TO CO-PENDING APPLICATION

This application claims the benefit of the filing date of co-pending provisional application serial No. 60/248,380, filed Nov. 14, 2000 in the name of Thomas A. Hnizdor, the entire contents of which are incorporated herein by reference.

BACKGROUND

The present invention relates, in general, to fishing artificial flies and lures, and, more specifically, to lures and flies which have added weights to cause the lure and fly to descend to greater depths in the water.

For catching certain species of fish, fishermen frequently add a separate weight to the line carrying the artificial lure or fly to cause the lure or fly to descend to greater depths in the water. Typically, such weights have been implemented by a metal tube of brass or copper. The external surface of the tube is decorated with hair, feathers and other fish attractor elements which are securely attached to the tube by means of glue, etc. A monofiliment line is inserted through the tube and has one end tied to a hook and the other end tied to the fishing reel. In this construction, the decorated tube is freely moveable along the line.

The reel facing end of the tube is typically flared a slight amount. This end, however, is frequently nicked or damaged as the lure is used, such as when the lure strikes a rock, submerged log, etc., in the water as the lure is pulled toward the fishermen. This nick creates a sharp edge or burr which frequently cuts the line thereby causing loss of the lure and the hook.

Thus, it would be desirable to provide an artificial lure which contains a weight and, at the same time, has an aesthetic fish attractor appearance. It would also be desirable to provide a weighted tube lure which overcomes the deficiencies of previously devised tube lures with respect to minimizing the potential loss of the lure and hook due to sharp edges on the weight tube.

SUMMARY

The present invention is a tube weight lure apparatus which utilizes a weight member in the form of a hollow tube fixedly mounted on a flexible inner tube extending between opposed ends of a hollow lure body.

In one aspect, the lure includes a body having a hollow interior cavity, a hollow tube weight disposed within the hollow interior cavity of the body, an inner tube extending through the tube weight. The body is fixedly attached to the inner tube such that a fishing line extending through the inner tube does not contact the tube weight.

In one aspect, the tube weight is compressedly fixed about the inner tube. The tube weight can also be a hollow tube which is compressed into engagement with the inner tube.

In another aspect, the inner tube has a length between opposed first and second ends greater than the distance between the points on the body to which the first and second ends of the inner tube are fixed. This causes the flexible inner tube to assume an arcuate shape between the first and second ends. In this aspect, the tube weight is disposed at the valley of the arcuate-shaped inner tube.

Alternately, the tube weight may be fixed at a number of variably selectable positions along the length of the inner tube within the hollow cavity in the body to provide different orientations of the lure in the water.

In another aspect of the invention, an insert is mounted within the hollow cavity of the body to provide the body with an attractor fish shape.

The weight in the lure of the present invention is unitarily provided as part of the lure without the need for a separate weight attachment to an existing lure which can detract from the fish attractor appearance of the lure. The weight, which is preferably in the form of hollow metal tube, is prevented from direct contact with the fishing line through the use of a flexible plastic inner tube disposed through the interior of a hollow tube and carrying the fishing line therethrough.

The flexible interior tube affords the opportunity to fixedly position the tube weight at any one of a number of different positions along the length of the lure body and the inner tube. For example, the weight tube can be positioned toward the front, center or rear of the body thereby respectively enabling the lure to exhibit greater diving potential, a generally bottom heavy central weight position in the water, or a rear weighted position where the nose of the lure rides upward through the water. The tube weight can also be fixed to the inner tube with most of the weight above the inner tube for a different tracking action in the water. At the same time, these different weight positions are possible without the need for any additional materials, components, labor and assembly time. Attaching the weight to the inner tube by crimping provides equal left and right side weights for truer tracking through the water.

BRIEF DESCRIPTION OF THE DRAWING

The various features, advantages and other uses of the present invention will become more apparent by referring to the following detailed description and drawing in which.

DETAILED DESCRIPTION

Figure 1:
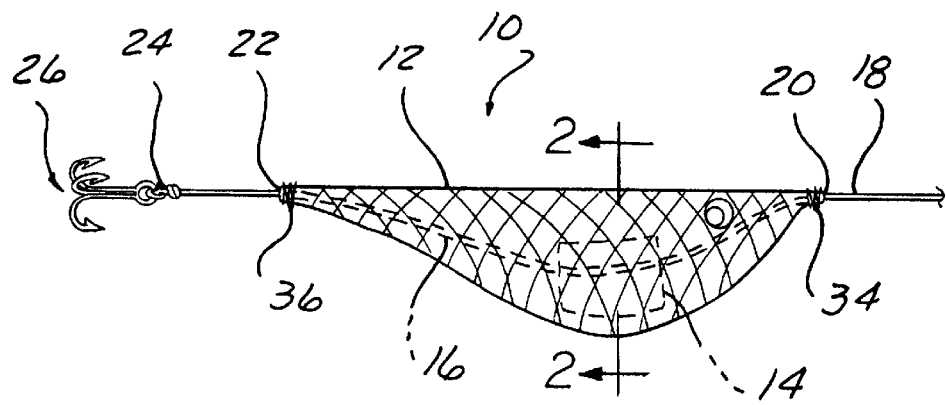
FIG. 1 is a side elevational view of an artificial lure constructed in accordance with the teachings of the present invention.
Figure 2:
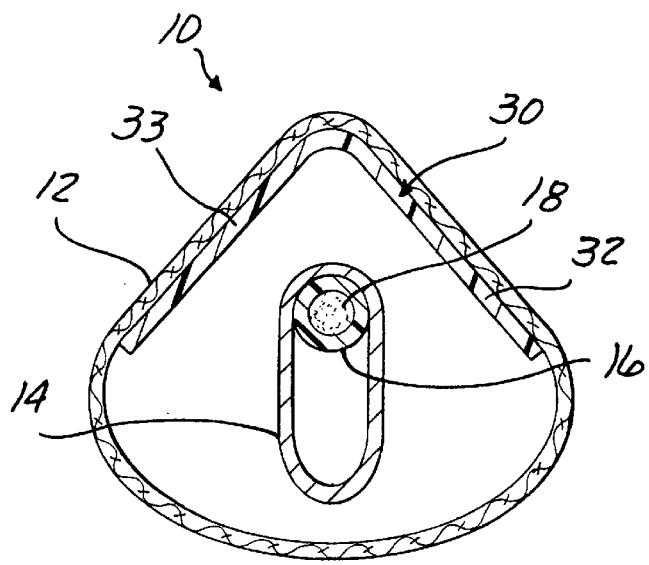
FIG. 2 is a cross sectional view generally taken along line 2—2 in FIG. 1.

Referring now to the drawing, and to FIGS. 1 and 2 in particular, there is depicted an artificial lure or fly 10, both hereafter referred to as an "artificial lure" which carries an internal weight to enable the lure to descend to greater depths in the water compared to an unweighted lure.

In a general order of assembly, the lure 10 includes a body 12, which is formed of any suitable lure material and can have any suitable fish attractor shape. By way of example only, the body 12 is in the form of a shad bait fish.

In an example only, the body 12 is formed of an expandable, tubular, woven mesh material, such as a woven mesh sold under the trade name "SKUF-Jacket" by Bentley-Harris Manufacturing Co., Lionville, Pa. This material is characterized by a strong high tear strength interwoven mesh lines having apertures disposed therebetween, which open to a hollow interior of the solid body 12. Depending on the diameter of the tubular woven mesh material, the size of the openings between adjacent crisscross members will vary.

The body 12 may also be formed of other suitable lure materials, such as foam, molded plastic, wood, etc. All that is required is that the material forming the lure 12 be capable of having a hollow interior, whether originally formed with a hollow interior or later having the hollow interior formed by removal of material from the inside of the solid body.

The tubular mesh material is cut to the desired length to form the body 12. A weight member such as a hollow weighted tube 14 is inserted into the hollow interior of the body 12. Particularly, the weighted tube 14 is preferably in the form of a hollow tube constructed of a heavy material. Ideally, metallic materials are used for the weighted tube 14, with brass and copper being preferred for their density, high weight, freshwater and saltwater corrosion resistance, environmental friendly attributes, ready availability and low purchase cost. The weighted tube 14 is of any suitable length, such as, preferably, a length shorter than the length of the body 12.

According to a unique feature of the present invention, a flexible, lightweight tube 16 is inserted into the interior of the weighted tube 14. Preferably, the lightweight tube 16 is formed of a plastic material, with nylon being a preferred material, by example only. The flexible tube 16 receives a fishing line, such as the nylon monofiliment line 18, which passes through a first end 20 of the body 12, then through the opposed second end 22 of the body 12 to a swivel connection 24 or directly to a hook 26. The hook 26 can be any style hook.

Prior to inserting the weighted tube 14 and the flexible tube 16 inside of the body 12, the weighted tube 14 is flattened or compressed under pressure to assume the generally oval shape shown in FIG. 2. This fixes the flexible tube 16 centrally in a side-to-side orientation in place within the weighted tube 14, such as along the top or bottom edge of the weighted tube 14 or centrally within the weighted tube 14 without distorting the diameter of the bore through the flexible tube 16 so as to enable the fishing line 18 to freely extend therethrough.

An insert 30 is also optionally, but preferably, disposed within the body 12 to form the body 12 to the desired fish attractor shape. By way of example only, and as described in greater detail in Applicant's prior U.S. Pat. Nos. 6,003,264 and 5,628,140, the insert 30 is in the form of a V-shaped member formed of two legs 32 and 33 which are joined along a common edge and angularly spaced apart at a 45° to 90° included angle. Other inserts, such as foam inserts, can also be mounted along the upper spine of the body 12 to make the body 12 track truly upright.

According to another unique aspect of the present invention, the flexible tube 16 has a length slightly greater than the overall length of the body 12 between the first and second ends 20 and 22 of the body 12. After the flexible tube 16 and the weighted tube 14 have been inserted into the hollow interior of the body 12, the first end 20 of the body 12 is fixedly secured to one end of the flexible tube 16 by means of cauterization and/or a plurality of threads 34 wound around the first end 20.

Similarly, the second end 22 of the body 12 is fixedly secured to the opposed end of the flexible tube 16 again by cauterization and/or a plurality of wound threads 36. Since the portion of the flexible tube 16 disposed within the body 12 has a slightly longer length than that body 12 between the first and ends 20 and 22 of the body 12, even though the ends of the flexible tube 16 extend outward beyond the ends 22 and 24 of the body 12, the flexible tube 16 assumes a bowed or arcuate shape between the opposed ends fixed to the first and second ends 20 and 22 of the body 12. This forces the weight 14 to the bottom portion of the body 12 along the apex of the curved flexible line 16 causing the body 12 to assume a more natural attractor, bait fish shape as well as to lower the center of gravity of the lure 10 causing the lure 10 to ride low in the water.

The wound threads 34 and 36 fixedly secure the body 12 in position on the flexible tube 16. Since the opposed ends of the flexible tube 16 are exposed through the first and second ends 20 and 22 of the body 12, the entire body 12 is freely slidable along the length of the line 18.

The use of the flexible tube 16 extending through the weighted tube 14 according to the present invention affords several advantages not possible with pre-existing lure weighting devices. Since the weighted tube 14, when flattened to the oval shape shown in FIG. 2, securely engages the flexible tube 16 in a press fit, the weighted tube 14 can be positioned anywhere along the length of the flexible tube 16 in the body 12. This affords the opportunity for a fisherman to select between lures 10 having at least three distinct weighted tube 14 positions. An intermediate weighted tube 14 position is shown in FIG. 1 and is described above.

Figure 3:
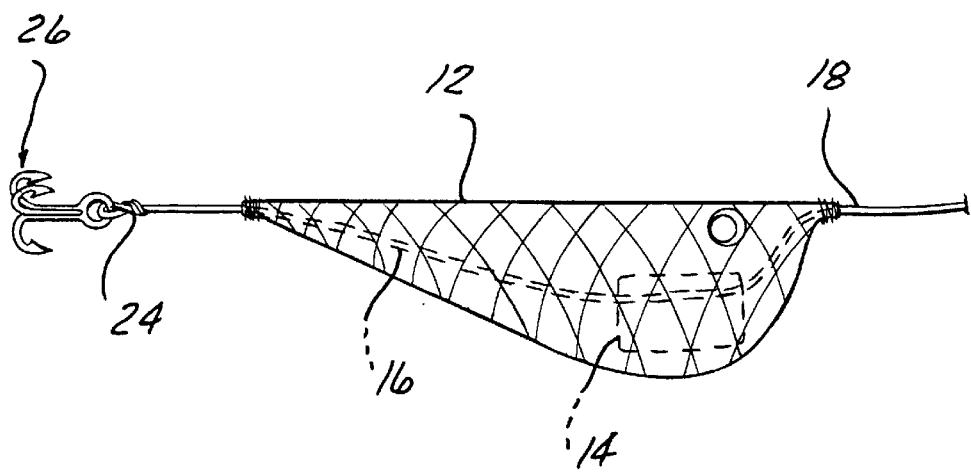
FIG. 3 is a side elevational view of a nose weighted lures according to the present invention.
Figure 4:
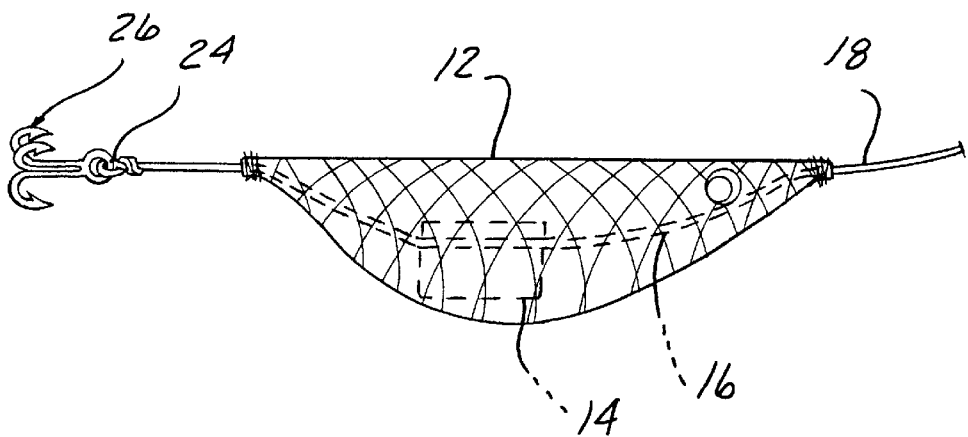
FIG. 4 is a side elevational view of a tail weighted lure according to the present invention.

Alternately, as shown in FIG. 3, the weighted tube 14 can be positioned further forward from the center of the flexible tube 16 toward the nose or first end 20 of the body 12 thereby providing a nose or front weighted lure 10 which is capable of diving to deep depths within the water.

Alternately, the weighted tube 14 can be positioned closer to the second end 22 of the body 12 from the centered position shown in FIG. 1 to form a rear weighted lure 12 which causes the nose or first end 20 of the body 12 to ride upward at a generally 45° angle when the lure 10 is pulled through the water.

The tube 16 can also be fixed to the body 12 in such a way that the tube 16 assumes a generally planar or straight end to end shape. This places the weighted tube 14 higher in the body 12 for a different tracking action in the water.

In summary, there has been disclosed a unique lure which has features not found in previous weighted lures or lures containing additional weight members. The unique weighted lure of the present invention provides the weight in the form of a tube with a construction which minimizes the possibility of sharp edges on the tube from nicking or breaking the fishing line extending through the tube which has heretofore resulted in the undesirable loss of the lure and the hook. At the same time, the tube weight can be disclosed at various positions within the body of the lure for different orientations of the lure in the water.

What is claimed is:

1. An artificial lure comprising:

a body having a hollow interior cavity;

a hollow weighted tube disposed within the hollow interior cavity of the body;

an inner tube extending through the weighted tube; and the body fixedly attached to the inner tube such that a fishing line extending through the inner tube, and supporting the inner tube and weighted tube, is disposed in non-contact with the weighted tube.

2. The artificial lure of claim 1 further comprising:

the weighted tube fixedly mounted on the inner tube.

3. The artificial lure of claim 2 wherein:

the weighted tube is compressedly fixed about the inner tube.

4. The artificial lure of claim 2 wherein:

the inner tube is a flexible tube.

5. The artificial lure of claim 1 wherein:

the inner tube is a flexible tube to enable the tube to assume an arcuate shape within the body.

6. The artificial lure of claim 5 wherein:

the weighted tube is variably positionably fixable along the length of the inner tube.

7. The artificial lure of claim 1 further comprising:

an insert disposed within the body to form the body to a fish attractor shape.

8. The artificial lure of claim 1 wherein:

the weighted tube is variably positionably fixable along the length of the inner tube.

9. The artificial lure of claim 8 wherein:

the inner tube is a flexible tube.

10. An artificial lure comprising:

a body having a hollow interior cavity;

a hollow weighted tube disposed within the hollow interior cavity of the body;

an inner tube extending through the weighted tube;

the body fixedly attached to the inner tube such that a fishing line extending through the inner tube is disposed in non-contact with the weighted tube;

the weighted tube fixedly mounted on the inner tube; and the inner tube has a length greater than the length of the body, the body fixedly secured to the first and second ends of the inner tube to cause the inner tube to assume a non-linear shape in the body.

11. The artificial lure of claim 10 wherein:

the inner tube has an arcuate shape; and the weighted tube is disposed at the valley of the arcuate shape of the inner tube.

12. An artificial lure comprising:

a body having a hollow interior cavity;

a hollow weighted tube disposed within the hollow interior cavity of the body;

an inner tube extending through the weighted tube;

the body fixedly attached to the inner tube such that a fishing line extending through the inner tube is disposed in non-contact with the weighted tube;

the weighted tube fixedly mounted on the inner tube;

the inner tube has a length greater than the length of the body, the body fixedly secured to the first and second ends of the inner tube to cause the inner tube to assume a non-linear shape in the body; and the inner tube is a flexible tube.

13. An artificial lure comprising:

a body having a hollow interior cavity;

a hollow weighted tube disposed within the hollow interior cavity of the body;

an inner tube extending through the weighted tube;

the body fixedly attached to the inner tube such that a fishing line extending through the inner tube is disposed in non-contact with the weighted tube; and the inner tube has a length greater than the length of the body, the body fixedly secured to the first and second ends of the inner tube to cause the inner tube to assume a non-linear shape in the body.

14. The artificial lure of claim 13 wherein:

the inner tube has an arcuate shape; and the weighted tube is disposed at the valley of the arcuate shape of the inner tube.

15. An artificial lure comprising:

an inner tube receiving a fishing line therethrough, a body having a hollow interior cavity, the inner tube extending through the cavity, the body fixed to the inner tube such that a fishing line ingresses into a first end of the inner tube, extends through the inner tube, and egresses out of a second end of the inner tube, the line is disposed in non-contact with a weight member; and the weight member smaller than the interior cavity fixedly mounted on the inner tube within the cavity in the body.

16. The artificial lure of claim 15 wherein the weight member comprises:

a weighted tube.

17. The artificial lure of claim 16 wherein:

the weighted tube is compressably fixed about the inner tube.

18. The artificial lure of claim 15 wherein:

the inner tube is a flexible tube.

19. The artificial lure of claim 18 wherein:

the weighted tube is variably positionably fixable along the length of the inner tube.

20. The artificial lure of claim 15 wherein:

the inner tube has a length greater than the length of the body, the body fixedly secured to a first end and a second end of the inner tube to cause the inner tube to assume a non-linear shape in the body.

21. The artificial lure of claim 20 wherein:

the inner tube has an arcuate shape; and the weight member is disposed at the valley of the arcuate shape of the inner tube.

22. The artificial lure of claim 15 further comprising:

an insert disposed within the body to form the body to a fish attractor shape.

* * * * *